Nov. 21, 1933.  W. E. DE WEESE  1,936,472
SUPERHEATER ATTACHMENT FOR INTERNAL COMBUSTION ENGINES
Filed May 28, 1931
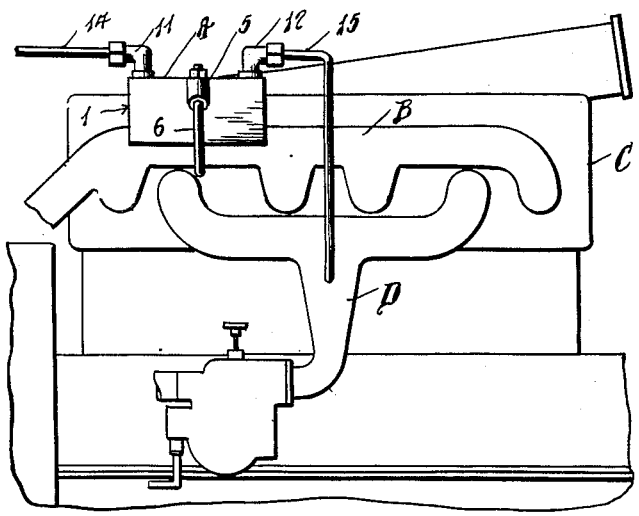
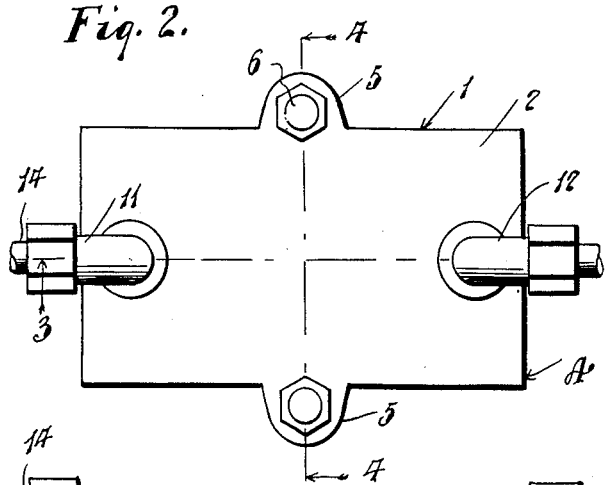
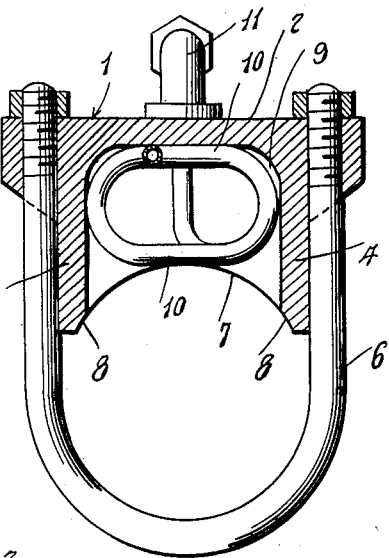
Inventor
W. E. DeWeese Patented Nov. 21, 1933

1,936,472

UNITED STATES PATENT OFFICE 1,936,472

SUPERHEATER ATTACHMENT FOR INTERNAL COMBUSTION ENGINES

Walter E. De Weese, Cleveland, Ohio

Application May 28, 1931. Serial No. 540,727

1 Claim. (Cl. 261—14)

The invention relates to a superheating attachment for use in connection with internal combustion engines and as an adjunct to an air moistener of the type such as disclosed in my Patent No. 1,755,056, dated April 15, 1930 and has for its principal object the provision of a means whereby the moisture laden air may be heated preliminary to introduction into the intake manifold, the moisture in the air being thereby vaporized so that an intimate mixture with the carbureted fuel in the intake manifold may be maintained.

A further object of the invention is the provision of an improved means for heating moisture laden air whereby the heat generated by the engine and imparted to the exhaust manifold may be utilized and including an enclosed chamber having for one of its walls the exhaust manifold, the moisture laden air being conveyed through a tube coiled within said chamber and subjected to the intense heat of the manifold to thoroughly superheat the air and the moisture for the purpose stated.

The invention will be described in detail hereinafter and will be found illustrated in the accompanying drawing, in which Figure 1 is a diagrammatical side view of an internal combustion engine showing the superheater applied to the exhaust manifold thereof, Figure 2 is a top plan view of the superheater attachment, Figure 3 a longitudinal sectional view on a plane indicated by the line 3—3 of Figure 2, and Figure 4 is a transverse sectional view on a plane indicated by the line 4—4 of Figure 2.

In the drawing similar reference characters are used to designate corresponding parts in all of the views.

In Figure 1 the improved superheater A is shown applied to the exhaust manifold B of an internal combustion engine C, D designating the intake manifold of the engine. The superheater comprises a casing 1 having a top wall 2, end walls 3, and side walls 4 and provided with laterally extending apertured ears 5 to receive the ends of a U-shaped clamp 6 to hold the casing 1 in position on the exhaust manifold B. The end walls 3 are provided with recesses 7 that are shaped to intimately engage the top of the manifold B, the usual contour of said recesses being arcuate as shown in the drawing but may obviously be any other shape to fit the type of manifold for which the superheater is to be used as an attachment. The inner lower edges of the side walls 4 are also preferably provided with arcuate faced bevels 8 concentric with the walls of the recesses 7 so that when the casing 1 is seated on the exhaust manifold as shown in the drawing an enclosed chamber 9 is provided having for one of its walls the exhaust manifold B, and said chamber 9 constitutes a heating chamber or a coil of pipe 10 arranged therein. 11 and 12 indicate coupling members secured to the respective ends of the coil 10, and secured in threaded openings 13 in the top wall 2. The coupling member 11 is connected by means of a tube or pipe 14 with a suitable air moistening device such for instance as that shown in my Patent No. 1,755,056, hereinbefore referred to, and the coupling member 12 is connected by means of a tube or pipe 15 with the intake manifold D into which said pipe is tapped or otherwise connected.

In operation it will be apparent that the moisture laden air entering through the pipe 14 and coupling 11 to the coil 10 will be heated by passage through said coil by the heat retained within the chamber 9 so that the moisture in the air will be expanded into vapor coextensive with heating the air, and the superheated air and vapor will pass up the coil 10 through the coupling 12 and tube or pipe 15 into the intake manifold B for mixture with the carbureted fuel therein, and thereby supply a moisture to the fuel that will make the operation of the engine more satisfactory or equivalent to operation of the engine at night or in the presence of humidity in the atmosphere.

It will also be apparent that the casing may be attached to the exhaust pipe as well as to the exhaust manifold, as described herein, as this may be found necessary in some types of engines wherein the manifold does not lend itself to use with the invention.

What is claimed is:—

A device of the class described, comprising a casing adapted to be applied to the exhaust duct of an internal combustion engine having a chamber therein opening out through one side of the casing, a top wall, side walls, end walls having recesses to receive the exhaust duct, openings in the top wall adjacent to the end walls, coupling members secured in said openings, a tubular member coiled in said chamber with the coils arranged transversely of the casing providing means whereby each coil may contact the exhaust duct in part of its length, the ends of said tubular member being secured in said coupling members.

WALTER E. DE WEESE.